United States Patent Office 3,136,814
Patented June 9, 1964

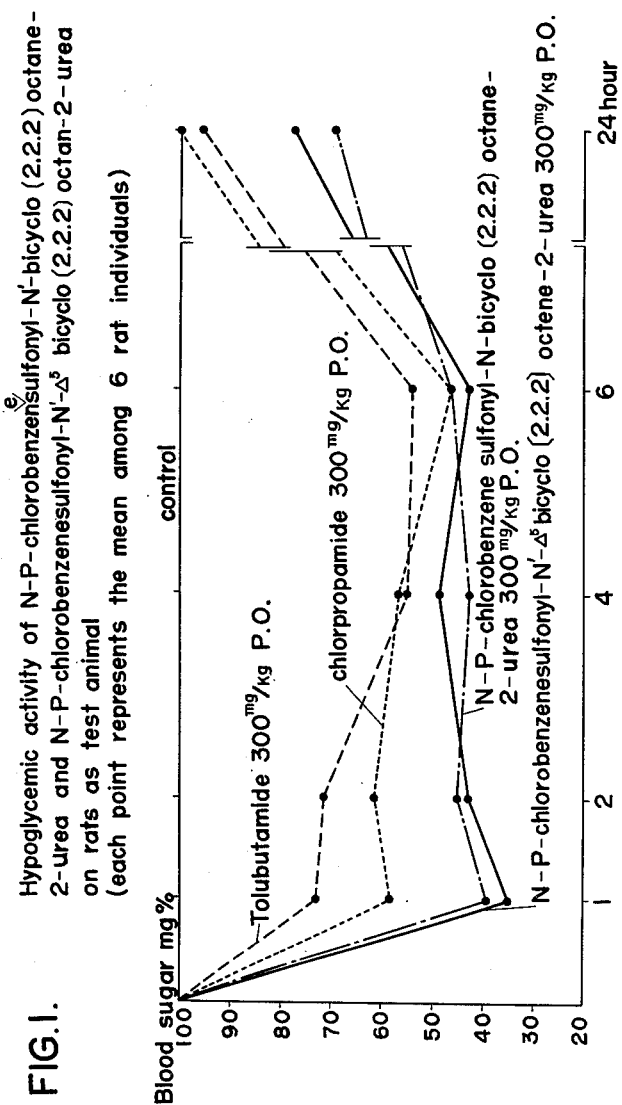

3,136,814
SULFONYLUREA DERIVATIVES
Tsutomu Irikura, 72 Shimura-Nakadaimachi, Itabashi-ku; Seigo Suzue, 32 3-chome, Ukima, Kita-ku; and Yasuo Abe, 122 1-chome, Onden, Shibuya-ku, all of Tokyo, Japan
Filed Sept. 12, 1962, Ser. No. 223,024
Claims priority, application Japan Apr. 7, 1962
3 Claims. (Cl. 260—553)

The present invention relates to novel sulfonylurea derivatives or salts thereof which are useful for the hypoglycemic action they can exert. These derivatives are represented by the following general formula:

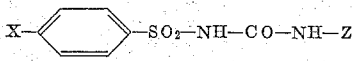

in which X stands for a halogen atom and Z means a cyclic radical

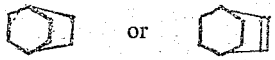

the derivatives of the present invention will hereinafter be indicated as a series of compounds representable by the formula (I)

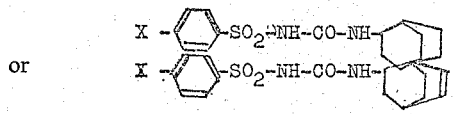

The sulfonylurea derivatives of the present invention can be synthesized in accordance with the following schemes: For the compounds of Series I

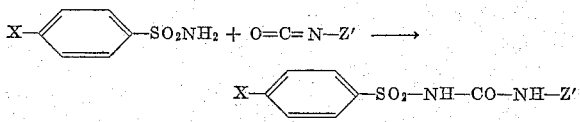

wherein Z' represents a bicyclic radical

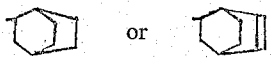

The compounds of Series I can be prepared by making a sulfonamide of the corresponding type as a salt of alkali, for example, sodium salt or potassium salt thereof in the presence of an appropriate solvent such as water, acetone or aqueous acetone react of an isocyanate of the corresponding type, namely, bicyclo (2,2,2) octane-2-isocyanate or $\Delta^5$-bicyclo (2,2,2) octene-2-isocyanate at a temperature between 0° C. and the boiling point of the specific solvent employed.

As a matter of fact, such compounds as represented by the above-presented general formula or the Formula I have not yet been reported in literature, their physiological activity being of course yet unknown. The inventors concerned, examining by using rats as test animal the hypoglycemic action of the compounds they prepared in accordance with the above-explained procedures and indeed in comparison with the known preparations of tolubutamide, namely, N-p-toluenesulfonyl-N'-butyl urea and of chloropropamide, namely, N-p-chlorobenzenesulfonyl-N'-n-propyl urea, found said new types of compounds to be eminently possessed of a hypoglycemic activity. They, thus confirming the dependency of the strength and durability of hypoglycemic action upon the peculiarity in chemical structure of the dosed medicine itself, enabled by way of the present invention to select a specific hypoglycemic medicine most opposite to the occasional clinical object.

Explaining the screening practiced among various types of compounds in their aspect of hypoglycemic activity, the experiment concerned was carried out as follows:

Test animal rat individuals having abstained from food for 24 hours were internally dosed each with a specified kind of test compound of 300 mg./kg. Blood sugar was determined at the times of 1, 2, 4, 6 and 24 hours after the dose while the rats were fed after the lapse of first 6 hours to facilitate the blood sugar value to be restored. The drop in blood sugar value was always estimated as mg. percent in reference to the blood sugar value for control which was appraised as 100. The values given herein are those averaged among 6 individuals of test rat.

In FIG. 1, the data showing hypoglycemic activity are presented for two representatives of the compounds having the structure of Formula I, namely, N-p-chlorobenzenesulfonyl-N'-bicyclo (2,2,2) octane-2-urea and N-p-chlorobenzenesulfonyl-N'-$\Delta^5$-bicyclo (2,2,2) octene-2-urea. These compounds may both be regarded as of better efficacy not only in the strength of potency but also in the length of duration as it is understood from the graphic results that rats dosed with these test compounds showed even after 24 hours blood sugar values lower by 2 mg. percent or so than those of control rats and restored their normal values of blood sugar first after the lapse of 48 hours.

Now, several examples of the practice of the present invention will be given in the following.

EXAMPLE 1

N-p-Chlorobenzenesulfonyl-N'-Bicyclo (2,2,2) Octane-2-Urea

In 20 cc. of acetone is dissolved 6 g. of p-chlorobenzenesulfonamide, added with 1.3 g. of NaOH dissolved in 40 cc. of water and further added at 10° C. drop by drop with 4 g. of bicyclo (2,2,2) octane-2-isocyanate. After stirring for 3 hours at room temperature, the reaction mixture is added with 100 cc. water, acidified by addition of 30% sulfuric acid so that precipitation of crystals takes place. The crystals are separated by filtration, brought to solution by treating with 5% sodium carbonate solution. The filtrate of the solution obtained as freed from insoluble matters is acidified to cause separation of crystals. The crystals are collected and recrystallized from a mixture of methanol and actonitrile (1:1), polyhedral, colorless crystals being obtained which has a melting point of 218° C.

IR absorption spectrum: $\nu_{N-H}$, 3360 and 2960 cm.$^{-1}$; $\nu_{C-O}$, 1658 cm.$^{-1}$; $\nu_{N-H}$ (amide II), 1540 cm.$^{-1}$; $\nu_{N-H}$ (amide III), 1450 cm.$^{-1}$; $\nu_{S-O}$, 1350 and 1165 cm.$^{-1}$; $\delta_{C-H}$ (p-substituted phenyl), 835 and 765 cm.$^{-1}$; $\delta_{C-H}$, 956 cm.$^{-1}$.

EXAMPLE 2

N - p - Chlorobenzenesulfonyl-N'-$\Delta^5$-Bicyclo(2,2,2)Octene-2-Urea

A reaction mixture comprising 6 g. of p-chlorobenzenesulfonylamide, 20 cc. acetone, 40 cc. aqueous sodium hydroxide containing 1.3 g. NaOH and 4 g. $\Delta^5$-bicyclo (2,2,2) octene-2-isocyanate is treated in the same way as in Example 1. After recrystallizing the product from a mixture of methanol and acetonitrile (1:1), there is obtained 5.3 g. of polyhedral, colorless crystals of which melting point is 224–6° C.

IR absorption spectrum: $\nu_{N-H}$, 3360 and 2960 cm.$^{-1}$; $\nu_{C-O}$, 1658 cm.$^{-1}$; $\nu_{N-H}$ (amide II), 1540 cm.$^{-1}$; $\nu_{N-H}$ (amide III), 1450 cm.$^{-1}$; $\nu_{S-O}$, 1350 cm.$^{-1}$ and 1165 cm.$^{-1}$; $\delta_{C-H}$ (p-substituted phenyl), 835 and 765 cm.$^{-1}$; $\delta_{C-H}$, 1158 cm.$^{-1}$ (characteristic); $\delta_{C-H}$, 1035 cm.$^{-1}$, 956 cm.$^{-1}$ and 846 cm.$^{-1}$ (shifted).

EXAMPLE 3

*N - p - Chlorobenzenesulfonyl - N'-Pyrrolidino-Urea*

In 50 cc. of benzene is dissolved 13 g. of p-chlorobenzenesulfonyl carbamic ethylester and added with 4.3 g. of N-amino-pyrrolidine. After heating the reaction mixture on a water bath for 30 minutes, the benzene is removed by evaporation. The residue is heated for 3 hours under a reduced pressure at 110°–125° C. and then recrystallized from methanol, 6.5 g. of colorless crystals (M.P. 201° C.) being obtained.

IR absorption spectrum: $\nu_{N-H}$, 3240 cm.$^{-1}$ and 3120 cm.$^{-1}$; $\nu_{C-O}$, 1710 cm.$^{-1}$; $\nu_{C=O}$, 1418 cm.$^{-1}$; $\nu_{S-O}$, 1355 cm.$^{-1}$, 1175 cm.$^{-1}$ and 1165 cm.$^{-1}$, $\nu_{S\ SO_2}$, 1100 cm.$^{-1}$; $\delta_{C-H}$, 1005 cm.$^{-1}$; $\delta_{C-H}$, 920 cm.$^{-1}$; $\nu_{C-Cl}$, 830 cm.$^{-1}$; $\delta_{N-H}$, 760 cm.$^{-1}$.

EXAMPLE 4

*N-p-Chlorobenzenesulfonyl-N'-Morpholino-Urea*

In 120 cc. of benzene, 26 g. of p-chlorobenzenesulfonyl carbamic ethylester is dissolved and added with 10 g. of N-aminomorpholine, a homogeneous solution being produced under a weak evolution of heat. After recovering the benzene by treating the reaction mixture under a reduced pressure, the remaining content of the reaction vessel is heated for 4 hours at 110–130° C. After cooling, 25.5 g. colorless crystals is obtained by recrystallization from ethanol, the compound aimed at being thus prepared as a specimen of which melting point is 206–208° C.

IR absorption spectrum: $\nu_{N-H}$, 3290 cm.$^{-1}$ and 3120 cm.$^{-1}$; $\nu_{C-O}$, 1705 cm.$^{-1}$; $\nu_{C=C}$, 1420 cm.$^{-1}$; $\nu_{S-O}$, 1350 cm.$^{-1}$; $\nu_{as\ SO_2}$, 1280 cm.$^{-1}$; $\nu_{S-O}$, 1176 cm.$^{-1}$ and 1162 cm.$^{-1}$; $\delta_{C-H}$, 1005 cm.$^{-1}$; $\delta_{C-H}$, 900 cm.$^{-1}$; $\nu_{C-Cl}$, 840 cm.$^{-1}$; $\delta_{N-H}$, 760 cm.$^{-1}$.

EXAMPLE 5

*N-p-Chlorobenzenesulfonyl-N'-3,5-Dimethyl Morpholino-Urea*

A mixture comprising 10 g. of N-amino-3,5-dimethyl morpholine, 20 g. of p-chlorobenzenesulfonyl carbamic ethylester and 50 cc. of benzene is treated in the same way as in Example 4. By recrystallization from methanol, 8 g. of colorless crystals as the preparation aimed at is obtained which has a melting point of 192–195° C.

IR absorption spectrum: $\nu_{N-H}$, 3240 cm.$^{-1}$ and 3320 cm.$^{-1}$; $\nu_{C-O}$, 1706 cm.$^{-1}$; $\nu_{C=C}$, 1420 cm.$^{-1}$; $\nu_{S-O}$, 1350 cm.$^{-1}$; $\nu_{as\ SO_2}$, 1290 cm.$^{-1}$; $\nu_{S-O}$, 1170 cm.$^{-1}$; $\nu_{S\ SO_2}$, 1090 cm.$^{-1}$; $\delta_{C-H}$, 1000 cm.$^{-1}$, 965 cm.$^{-1}$ and 905 cm.$^{-1}$; $\nu_{C-Cl}$, 830 cm.$^{-1}$; $\delta_{N-H}$, 760 cm.$^{-1}$.

EXAMPLE 6

*N-p-Chlorobenzenesulfonyl-N'-Piperidino-Urea*

A mixture consisting of 5 g. N-aminopiperidine, 13 g. of p-chlorobenzenesulfonyl carbamic ethylester and 50 cc. of benzene is treated in the same way as in Example 4. On recrystallizing from methanol, there is obtained 8.3 g. of colorless crystals of the compound aimed at which has a melting point of 206–209° C.

IR absorption spectrum: $\nu_{N-H}$, 3260 cm.$^{-1}$ and 3120 cm.$^{-1}$; $\nu_{C-O}$, 1710 cm.$^{-1}$, $\delta_{N-H}$, 1580 cm.$^{-1}$; $\nu_{C=O}$, 1430 cm.$^{-1}$; $\nu_{C-O}$, 1355 cm.$^{-1}$ $\nu_{as\ SO_2}$, 1290 cm.$^{-1}$; $\nu_{S-O}$, 1178 cm.$^{-1}$ and 1165 cm.$^{-1}$; $\nu_{S\ SO_2}$, 1090 cm.$^{-1}$; $\delta_{C-H}$, 1020 cm.$^{-1}$ and 986 cm.$^{-1}$; $\delta_{C-H}$, 900 cm.$^{-1}$ $\nu_{C-Cl}$, 850 cm.$^{-1}$, $\delta_{NH}$, 760 cm.$^{-1}$.

EXAMPLE 7

*N-p-Chlorobenzenesulfonyl-N'-Hexahydroazepino-Urea*

With 9.8 g. of potassium salt of p-chlorobenzenesulfonylamide (0.043 mol) is thoroughly mixed 8 g. of ethyl-hexahydroazepino-carbamate (0.043 mol). The mixture is then heated for 4 hours at 130–140° C. on an oil bath. By recrystallizing the reaction product from a mixed solution made of diethyleneglycol dimethylether and dimethylformamide (1:3), there is obtained 4 g. of somewhat refined product melting at 176–179° C. After three times repetition of recrystallization, a product of high purity is obtained of which melting point is 205° C.

As $C_{13}H_{18}N_3O_2S$ Cl, calculated value: N, 12.67%. Analytical value: N, 12.90%.

EXAMPLE 8

*N-p-Chlorobenzenesulfonyl-N'-Hexahydroazepino-Urea*

Into 250 cc. of beinzene, 26 g. (0.228 mol) of 1-aminohexahydroazepine and 60 g. (0.228 mol) of ethyl-p-chlorobenzenesulfonyl carbamate are brought. The mixture is then heated for 30 minutes under reflux on a water bath until there takes place a complete dissolution. Immediately thereafter, the benzene is evaporated off, and the residue is heated on an oil bath for 4 hours at 130–140° C. under a reduced pressure. By recrystallizing the content of the reaction vessel three times in the same way as in Example 7, the compound aimed at is obtained as a preparation having a melting point of 205° C., the yield amounting to 29 g.

IR absorption spectrum: $\nu_{N-H}$, 3200 cm.$^{-1}$ and 3100 cm.$^{-1}$; $\nu_{C-O}$, 1710 cm.$^{-1}$; $\delta_{N-H}$, 1590 cm.$^{-1}$; $\nu_{C=C}$, 1440 cm.$^{-1}$; $\nu_{S-O}$, 1360 cm.$^{-1}$; $\nu_{as\ SO_2}$, 1300 cm.$^{-1}$; $\nu_{S-O}$, 1180 cm.$^{-1}$ and 1170 cm.$^{-1}$; $\nu_{S\ SO_2}$, 1100 cm.$^{-1}$; $\delta_{C-H}$, 1020 cm.$^{-1}$ and 990 cm.$^{-1}$; $\delta_{C-H}$, 900 cm.$^{-1}$; $\nu_{C\ Cl}$, 840 cm.$^{-1}$; $\delta_{N-H}$, 765 cm.$^{-1}$.

Having thus described the invention, what is claimed as new and desired to be secured by Letters Patent is:

1. A sulfonylurea derivative of the formula:

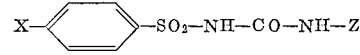

in which X is halogen and Z is selected from the group consisting of

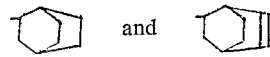

2. N-(p-chlorobenzenesulfonyl) - N' - bicyclo (2,2,2) octane 2-urea.

3. N-(p-chlorobenzenesulfonyl)-N'-$\Delta^5$ - bicyclo (2,2,2) octene-2-urea.

References Cited in the file of this patent

UNITED STATES PATENTS

| | | |
|---|---|---|
| 2,928,871 | Aeschliman et al. | Mar. 15, 1960 |
| 2,953,578 | Haack et al. | Sept. 20, 1960 |
| 2,969,391 | Aeschlimann et al. | Jan. 24, 1961 |
| 3,041,331 | Wright | June 26, 1962 |
| 3,063,903 | Wright | Nov. 13, 1962 |
| 3,072,720 | Wright | Jan. 8, 1963 |
| 3,096,372 | Gerzon | July 2, 1963 |

FOREIGN PATENTS

| | | |
|---|---|---|
| 831,044 | Great Britain | Mar. 23, 1960 |

OTHER REFERENCES

Marshall et al.: J. Org. Chem., vol. 23, pp. 927–929 (1958), QD 241 J6.

French Patent Abstracts, vol. 2, No. 26, Group 3, page 3 (June 1962).